(12) United States Patent
Martin et al.

(10) Patent No.: US 12,103,074 B1
(45) Date of Patent: Oct. 1, 2024

(54) ARCHITECTED MATERIALS WITH CONTROLLED PERMEABILITY AND METHODS FOR MAKING AND USING THE SAME

(71) Applicant: HRL Laboratories, LLC, Malibu, CA (US)

(72) Inventors: John H. Martin, Oxnard, CA (US); Brennan Yahata, Santa Barbara, CA (US); Darby Laplant, Ventura, CA (US); Christopher Roper, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 2 days.

(21) Appl. No.: 17/702,789

(22) Filed: Mar. 24, 2022

Related U.S. Application Data

(60) Provisional application No. 63/167,711, filed on Mar. 30, 2021.

(51) Int. Cl.
*B33Y 80/00* (2015.01)
*B22F 10/20* (2021.01)
(Continued)

(52) U.S. Cl.
CPC .............. *B22F 10/20* (2021.01); *B28B 1/001* (2013.01); *B29C 64/141* (2017.08); *B33Y 10/00* (2014.12); *B33Y 80/00* (2014.12)

(58) Field of Classification Search
CPC ....... B22F 10/20; B28B 1/001; B29C 64/141; B33Y 10/00; B33Y 80/00
See application file for complete search history.

(56) References Cited

U.S. PATENT DOCUMENTS

| | | | |
|---|---|---|---|
| 4,838,346 | A | 6/1989 | Camarda et al. |
| 4,883,116 | A | 11/1989 | Seidenberg et al. |

(Continued)

OTHER PUBLICATIONS

Kasen, "Thermal Management at Hypersonic Leading Edges", Ph.D. Dissertation, University of Virginia, May 2013.
(Continued)

*Primary Examiner* — John A Hevey
(74) *Attorney, Agent, or Firm* — O'Connor & Company; Ryan P. O'Connor

(57) ABSTRACT

Some variations provide an additively manufactured article comprising a first region and a second region, wherein the first region is a solid region or a porous region, wherein the second region has a pore size larger than the first-region pore size, and wherein the first-region average permeability is lower than the second-region average permeability. Some variations provide a co-sintering method of making an architected material with regions having different permeabilities, in which different additive-manufacturing process parameters are applied to distinct regions of the structure. Other variations provide a wall-pinning method of making an architected material with regions having different permeabilities, in which additive-manufacturing process parameters are selected to sinter pinned feedstock powder between solid walls. Engineered structures with controlled permeability, integrated manifolds, and arbitrary geometries are disclosed, without the requirement of complex manufacturing. Many uses are described for the disclosed additively manufactured articles.

22 Claims, 8 Drawing Sheets

(51) Int. Cl.
  *B28B 1/00*   (2006.01)
  *B29C 64/141*  (2017.01)
  *B33Y 10/00*   (2015.01)

(56) References Cited

U.S. PATENT DOCUMENTS

| | | | |
|---|---|---|---|
| 5,720,339 | A | 2/1998 | Glass et al. |
| 7,687,132 | B1 | 3/2010 | Gross et al. |
| 8,844,877 | B1 | 9/2014 | Driemeyer et al. |
| 9,920,530 | B2 | 3/2018 | Wadley et al. |
| 10,030,292 | B2 | 7/2018 | Martin et al. |
| 10,682,699 | B2 | 6/2020 | Martin et al. |
| 2017/0014937 | A1 | 1/2017 | Wilhelmy et al. |
| 2018/0010215 | A1 | 1/2018 | Sanaty-Zedah et al. |
| 2018/0187984 | A1* | 7/2018 | Manzo ............... F28F 13/12 |
| 2018/0354860 | A1* | 12/2018 | Wang ............... C04B 35/632 |
| 2019/0032175 | A1 | 1/2019 | Martin et al. |
| 2019/0040503 | A1 | 2/2019 | Martin et al. |
| 2019/0291182 | A1 | 9/2019 | Bobel et al. |
| 2019/0299290 | A1* | 10/2019 | Kuhns ............... B22F 3/11 |
| 2020/0123640 | A1 | 4/2020 | Bobel et al. |
| 2021/0216683 | A1* | 7/2021 | Rai ............... B29C 64/386 |
| 2022/0297369 | A1* | 9/2022 | Benjamin ............... B22F 5/106 |
| 2023/0039200 | A1* | 2/2023 | Perego ............... B33Y 70/00 |
| 2023/0114676 | A1* | 4/2023 | Harris ............... A61F 2/3094 |
| | | | 606/248 |

OTHER PUBLICATIONS

Glass, "Ceramic Matrix Composite (CMC) Thermal Protection Systems (TPS) and Hot Structures for Hypersonic Vehicles", 15th AIAA Space Planes and Hypersonic Systems and Technologies Conference, American Institute of Aeronautics and Astronautics, https://ntrs.nasa.gov/search.jsp?R=20080017096 2019-11-12T21:20:43+00:00Z.

Zhang et al., "Tailoring Permeability of Microporous Copper Structures through Template Sintering" ACS Appl. Mater. Interfaces 2018, 10, 30487-30494.

* cited by examiner

ARCHITECTED MATERIALS WITH CONTROLLED PERMEABILITY AND METHODS FOR MAKING AND USING THE SAME

PRIORITY DATA

This patent application is a non-provisional application with priority to U.S. Provisional Patent App. No. 63/167,711, filed on Mar. 30, 2021, which is hereby incorporated by reference herein.

STATEMENT REGARDING FEDERALLY SPONSORED RESEARCH OR DEVELOPMENT

This invention was made with Government support under Contract No. FA8650-20-C-7002. The Government has certain rights in this invention.

FIELD OF THE INVENTION

The present invention generally relates to structures having controlled permeability, and methods of making and using these structures.

BACKGROUND OF THE INVENTION

Permeability in a measure of the ability of a porous material to allow a fluid to pass through it. The permeability of a material is related to the porosity, as well as to the shapes of the pores and the connections between pores.

The optimal permeability of a fluid through a material will depend on the intended application of the material and fluid. In some cases, it is desirable to have multiple regions with different permeabilities. For example, a structure may be designed to allow high permeability through a manifold but low permeability through a region surrounding the manifold. Such a configuration requires spatial permeability control.

Conventional porous membranes, frits, or filters are typically uniform or highly directional in permeability, due to processing restrictions. Frits and metal filters are typically made by sintering powders in which the powder size and pressure applied dictate the bulk permeability. Introducing a hierarchy of permeability has required production of multiple independent structures with varying permeability, followed by assembly of the distinct structures together in secondary steps, or complicated plumbing and manifolds.

Spatial permeability control has wide-ranging commercial applications, such as fuel or chemical injection in combustion (e.g., scramjets). In the case of spatially controlled gas flow, permeability control may enhance stability of laminar flow, thereby increasing aerodynamic efficiency. Other applications include, but are not limited to, medical diagnostics, microfluidics, battery electrodes, electrochemical sensors, and catalysts.

There is a commercial desire for structures with variable permeability, integrated manifolds, and arbitrary geometries without the requirement of complex manufacturing.

SUMMARY OF THE INVENTION

The present invention addresses the aforementioned needs in the art, as will now be summarized and then further described in detail below.

Some variations of the invention provide an additively manufactured article comprising a first region and a second region, wherein the first region has a first-region pore size, wherein the second region has a second-region pore size, wherein the second-region pore size is larger than the first-region pore size, wherein the first region is characterized by a first average permeability, wherein the second region is characterized by a second average permeability, and wherein the first average permeability is lower (e.g., at least one order of magnitude lower) than the second average permeability.

In some embodiments, the first average permeability is at least two orders of magnitude lower than the second average permeability.

The first average permeability may be selected from about 0.1 mD to about 100 D, for example (D=Darcy unit). In various embodiments, the first average permeability is selected in the range of about 0.1-1 mD, about 1-10 mD, about 10-100 mD, about 100 mD-1 D, about 1-10 D, about 10-100 D, or about 100-1000 D, for example.

The second average permeability may be selected from about 1 mD to about 1000 D, for example. In various embodiments, the second average permeability is selected in the range of about 1-10 mD, about 10-100 mD, about 100 mD-1 D, about 1-10 D, about 10-100 D, about 100-1000 D, or about 1000-10000 D, for example. The second average permeability may be independently selected from the first average permeability.

In some embodiments, the additively manufactured article further comprises a third region, wherein the third region is characterized by a third average permeability. The third average permeability may be higher than the second average permeability. The third region may be a manifold or plenum, for example. In other embodiments, the third average permeability is lower than the first average permeability. In certain embodiments, the third average permeability is intermediate between the first average permeability and the second average permeability.

The spatially controlled structure may be referred to herein as a "composite structure" which means that there are multiple distinct regions within the structure. In some embodiments, the composite structure contains one solid region and one porous region. The composite structure may be a matrix-inclusion composite, such as one containing porous prismatic elements (e.g., cylinders or rectangular slots) throughout an otherwise-solid matrix.

In certain embodiments, the first region and the second region form an interpenetrating structure. The interpenetrating structure may contain one continuous first region, or one continuous second region. In certain embodiments, the interpenetrating structure is a bicontinuous structure, with both a continuous first region and a continuous second region.

In some embodiments, the first region is a solid region, which means an average porosity less than 1%, less than 0.5%, less than 0.2%, less than 0.1%, or about 0%.

In some embodiments, the first region has an average porosity from about 1% to about 50%.

In some embodiments, the first-region pore size is less than 100 nanometers. In other embodiments, the first-region pore size is selected from about 100 nanometers to about 250 microns. For example, the first-region pore size may be selected from about 1 micron to about 200 microns. The first-region pore size may be less than about 200 microns, less than about 150 microns, less than about 100 microns, less than about 50 microns, less than about 10 microns, less than about 5 microns, less than about 2 microns, or less than about 1 micron, for example.

In some embodiments, the second region has an average porosity from about 10% to about 95%. The second-region pore size may be selected from about 50 microns to about 1 millimeter, for example. In some embodiments, the second-region pore size is selected from about 10 microns to about 10 millimeters, such as from about 50 microns to about 1 millimeter.

In some additively manufactured articles, the first region and the second region are co-sintered regions. In other additively manufactured articles, the first region is a wall-pinned region disposed adjacent to the second region, such as a solid second region.

The additively manufactured article may be fabricated from a metal, a metal alloy, a ceramic material, a polymer, a biological material, or a combination thereof. In some embodiments, the additively manufactured article is fabricated from a metal selected from the group consisting of nickel, aluminum, niobium, tungsten, iron, titanium, zirconium, silicon, combinations thereof, and alloys, oxides, carbides, nitrides, or hydrides of any of the foregoing. In some embodiments, the additively manufactured article is fabricated from a ceramic material selected from the group consisting of SiC, SiN, $SiO_2$, $Al_2O_3$, $ZrO_2$, combinations thereof, and alloys of any of the foregoing.

Some variations provide a co-sintering method of making an architected material with regions having different permeabilities, the method comprising:
(a) defining a composite structure to be fabricated, wherein the composite structure contains at least a first region and a second region;
(b) introducing an additive-manufacturing feedstock to a build volume;
(c) additively manufacturing an architected material utilizing a first set of process parameters to fabricate the first region and a second set of process parameters to fabricate the second region, wherein the first region has a first-region pore size selected from about 100 nanometers to about 250 microns, wherein the second region has a second-region pore size that is larger than the first-region pore size, wherein the first region is characterized by a first average permeability, wherein the second region is characterized by a second average permeability, and wherein the first average permeability is lower (e.g., at least one order of magnitude lower) than the second average permeability; and
(d) recovering the architected material from the build volume.

In some methods, the additive-manufacturing feedstock is a powder. In other methods, the additive-manufacturing feedstock is a wire. In certain methods, the additive-manufacturing feedstock is a wire and a powder, such as at different times during additive manufacturing.

The additive-manufacturing feedstock may be a metal, a metal alloy, a ceramic material, a polymer, a biological material, or a combination thereof.

In some methods, in step (c), the first region and the second region are fabricated simultaneously. Alternatively, the second region may be fabricated before the first region, or the second region may be fabricated after the first region.

In certain embodiments, the method further comprises applying the first set of process parameters (e.g., sintering parameters) to the second region. For example, it may be desirable to reduce the permeability at the walls by sintering some powder in the wall region, in addition to sintering in the initial negative space.

In certain embodiments, the method further comprises applying the second set of process parameters (e.g., melting/solidification parameters) to the first region. For example, it may be desirable to melt and resolidify some of the sintered region.

Other variations provide a wall-pinning method of making an architected material with regions having different permeabilities, the method comprising:
(a) defining a composite structure to be fabricated, wherein the composite structure is characterized by a wall spacing selected from about 25 microns to about 500 microns;
(b) introducing an additive-manufacturing feedstock powder to a build volume;
(c) additively manufacturing an architected material utilizing a set of process parameters to fabricate a wall region, and wherein the process parameters are selected to retain pinned feedstock powder between walls of the wall region;
(d) consolidating the pinned feedstock powder to fabricate a pinned region; and
(e) recovering the architected material from the build volume,
wherein the pinned region is characterized by a first average permeability, wherein the wall region is characterized by a second average permeability, and wherein the first average permeability is lower (e.g., at least one order of magnitude lower) than the second average permeability.

The additive-manufacturing feedstock powder may be a metal, a metal alloy, a ceramic material, a polymer, a biological material, or a combination thereof.

In some wall-pinning methods, the wall spacing is about 200 microns or less, such as about 100 microns or less. In some wall-pinning methods, the wall spacing is about 200 microns or greater. In certain methods, the wall spacing is selected from about 50 microns to about 200 microns.

In some wall-pinning methods, the consolidating in step (d) is passive sintering driven by residual heat associated with the wall region. Alternatively, or additionally, the consolidating may be active sintering driven by additional heat introduced to the pinned feedstock powder.

In some wall-pinning methods, the consolidating is physical powder trapping with incomplete powder sintering. In certain embodiments, the consolidating is physical powder trapping with substantially no powder sintering.

DETAILED DESCRIPTION OF EMBODIMENTS OF THE INVENTION

Figure 1:
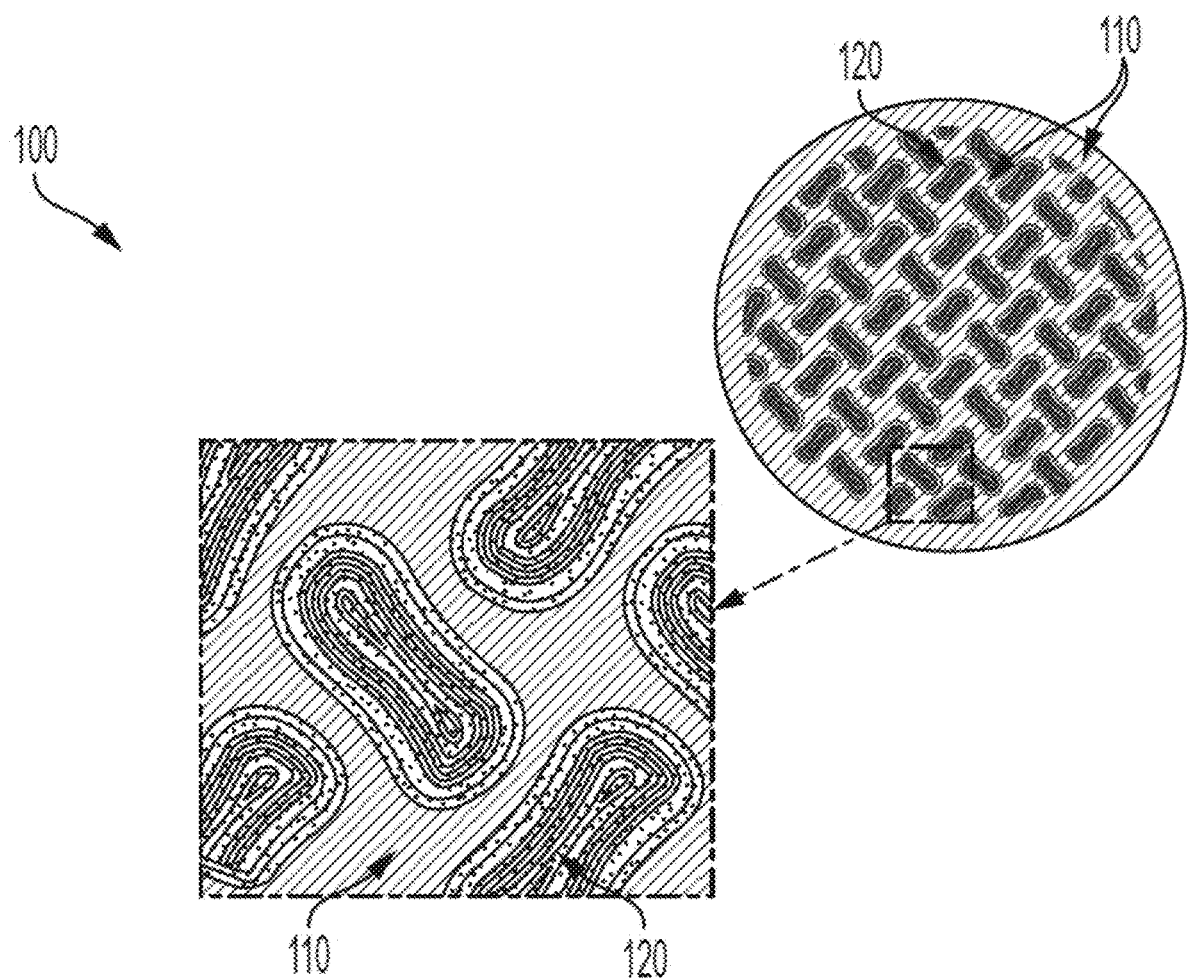
FIG. 1 depicts a 2D view (including a zoomed-in view) of an exemplary co-sintered additively manufactured article, in some variations.

The structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention provides methodologies and architectures to spatially control permeability in porous structures utilizing additive manufacturing (synonymously, 3D printing). Under constant supplied pressure or fluid flow rate from a supply source, in some variations, the spatially controlled architecture can controllably distribute fluid flow. The disclosed methodologies and architectures enable feature size control at least an order of magnitude smaller than the commonly understood limits of additive manufacturing. Additive manufacturing also enables arbitrary geometries for the controlled-permeability structures. This specification describes production of structures with variable permeability, integrated manifolds, and arbitrary geometries.

Conventionally, porous metal or ceramic media are produced via controlled compaction and sintering to produce a uniformly permeable structure. Additive manufacturing has been previously used to create flow manifolds within the bounds of the printer resolution, typically >250 microns. In practice, the length scale of flow manifolds tends to be much higher (>400 microns) to ensure removal of unmelted powder from the manifold after it has been 3D-printed.

Sintering using additive-manufacturing techniques has been proposed, but such techniques have been focused on replicating the bulk sintering approach. It is believed to be heretofore not possible to spatially control or even dictate the permeability of a structure fabricated via additive manufacturing. In this disclosure, "spatial" control refers to control in three dimensions.

This disclosure provides two independent techniques for controlling permeability, resulting in similar final structures. Briefly, one technique utilizes co-sintering, in which a specific architecture is designed to prepare open volumes of powder, which can be sintered at a selected power density that is directly correlated to the degree of sintering and, consequently, the permeability of the sintered material. Another technique utilizes "wall pinning" in which a specific architecture is designed to pin powders between two formed walls while avoiding fully closing the gap between the walls. The two techniques may also be combined in some embodiments. These fabrication techniques will be described in more detail below.

Some variations of the invention provide an additively manufactured article comprising a first region (which may be solid or porous) and a second region, wherein the second region has a second-region pore size that is larger than the first-region pore size, wherein the first region is characterized by a first average permeability, wherein the second region is characterized by a second average permeability, and wherein the first average permeability is lower than the second average permeability.

In this disclosure, "permeability" means fluid permeability in accordance with Darcy's law. Darcy's law was first determined experimentally by Darcy in the 1850s, and is also derived from Navier-Stokes theory. Darcy's law is analogous to Fourier's law in heat conduction, Ohm's law in electrical networks, and Fick's law in diffusion theory. The units of permeability are D, which denotes darcy (mD denotes millidarcy). Permeability may be measured via capillary flow porometry with air or water, for example. The average permeability of a region corresponds to the measured permeability through the region, recognizing that the permeability may vary locally within the region.

Some embodiments provide an additively manufactured article comprising a first region and a second region, wherein the first region has a first-region pore size, wherein the second region has a second-region pore size, wherein the second-region pore size is larger than the first-region pore size, wherein the first region is characterized by a first average permeability, wherein the second region is characterized by a second average permeability, and wherein the first average permeability is lower (e.g., at least one order of magnitude lower) than the second average permeability.

The first average permeability is lower than the second average permeability, which means that there is a statistical difference in permeabilities, outside of random variations in the first and second regions. In various embodiments, the first average permeability is about, or at least about, 1%, 5%, 10%, 25%, 50%, 100%, 200%, 300%, 400%, 500%, 600%, 700%, 800%, 900%, or 1000% lower than the second average permeability, including all intervening ranges. Preferably, the first average permeability is at least one order of magnitude lower than the second average permeability. In this disclosure, a difference of an "order of magnitude" means a difference of at least 800%.

In some embodiments, the first average permeability is about, or at least about, 1000%, 2000%, 3000%, 4000%, 5000%, 6000%, 7000%, 8000%, 9000%, or 10000% lower than the second average permeability, including all intervening ranges. In certain embodiments, the first average permeability is at least two orders of magnitude lower than the second average permeability. In this disclosure, a difference of "two orders of magnitude" means a difference of at least 8000%.

The ratio of the second average permeability to the first average permeability may be about, or at least about 2, 5, 8, 10, 12, 15, 20, 25, 50, 80, 100, 150, 200, 250, 500, 750, or 1000, including all intervening ranges.

The first average permeability may be selected from about 0.1 mD to about 100 D, for example. In various embodiments, the first average permeability is selected in the range of about 0.1-1 mD, about 1-10 mD, about 10-100 mD, about 100 mD-1 D, about 1-10 D, about 10-100 D, or about 100-1000 D, for example. In various embodiments, the first average permeability is about, at least about, or at most about 0.05 mD, 0.1 mD, 0.2 mD, 0.5 mD, 1 mD, 2 mD, 3 mD, 4 mD, 5 mD, 10 mD, 15 mD, 20 mD, 25 mD, 50 mD, 75 mD, 100 mD, 200 mD, 300 mD, 400 mD, 500 mD, 750 mD, 1 D, 2 D, 5 D, 10 D, 25 D, 50 D, 100 D, 200 D, 300 D, 400 D, 500 D, 750 D, or 1000 D, including all intervening ranges. The first average permeability may be unimodal or polymodal (e.g., bimodal) in distribution of permeabilities within the first region. In some embodiments, the first region is solid (non-porous) or has a very low porosity, in which case the first average permeability is very low, and potentially even 0 mD.

The second average permeability may independently be selected from about 1 mD to about 1000 D, for example. In various embodiments, the second average permeability is selected in the range of about 1-10 mD, about 10-100 mD, about 100 mD-1 D, about 1-10 D, about 10-100 D, about 100-1000 D, or about 1000-10000 D, for example. The second average permeability may be independently selected from the first average permeability. In various embodiments, the second average permeability is about, at least about, or at most about 0.5 mD, 1 mD, 1.5 mD, 2 mD, 3 mD, 4 mD, 5 mD, 10 mD, 15 mD, 20 mD, 25 mD, 50 mD, 75 mD, 100 mD, 200 mD, 300 mD, 400 mD, 500 mD, 750 mD, 1 D, 2 D, 5 D, 10 D, 25 D, 50 D, 100 D, 200 D, 300 D, 400 D, 500 D, 750 D, or 1000 D, 1500 D, 2000 D, 2500 D, 3000 D, 4000 D, 5000 D, 6000 D, 7000 D, 8000 D, 9000 D, or 10000 D, including all intervening ranges. The second average permeability may be unimodal or polymodal (e.g., bimodal) in distribution of permeabilities within the second region. In some embodiments, the second region is a substantially open region, such as a manifold or plenum, in which case the permeability is very high.

In some embodiments, the additively manufactured article further comprises a third region, wherein the third region is characterized by a third average permeability. The third average permeability may be higher than the second average permeability. The third region may be a manifold or plenum, for example, with very high permeability, to provide an additional fluid flow path or direction. In other embodiments, the third average permeability is lower than the first average permeability. For example, the third region may be non-porous or have a very low porosity, in which case the third average permeability is very low or even zero (flow-blocking). In certain embodiments, the third average permeability is intermediate between the first average permeability and the second average permeability.

The third region, when present, may be disposed outside of the first and second regions, such as in an outer wall of an overall structure. In other embodiments, the third region is interposed between the first region and second region. In such embodiments, the first and second regions are not in direct contact. For example, the first and second regions may be porous regions, with different permeability, physically separated by a solid third region.

The additively manufactured article may have 2, 3, 4, 5, 6, 7, 8, 9, 10, or more distinct permeabilities within the spatially controlled structure. There may be a continuous or discontinuous gradient of permeability in one dimension, two dimensions, or three dimensions. Within a particular region, the permeability may be constant, continuously increasing, continuously decreasing, or continuously variable in any direction.

The spatially controlled structure may be referred to herein as a "composite structure" which means that there are multiple distinct regions within the structure. In some embodiments, the composite structure contains one solid region and one porous region. The composite structure may be a matrix-inclusion composite, such as one containing porous prismatic elements (e.g., cylinders or rectangular slots) throughout an otherwise-solid matrix.

One example of a composite structure is a triply periodic minimal surface (TPMS). In geometry, a triply periodic minimal surface is a minimal surface in three dimensions that is invariant under a rank-3 lattice of translations. Numerous examples are known with cubic, tetragonal, rhombohedral, and orthorhombic symmetries. In this disclosure, the additively manufactured article may have a TPMS architecture, which may be gyroid, lidinoid, or any other of a large number of known triply periodic minimal surfaces. See, for example, Yan et al., *Triply Periodic Minimal Surface Lattices Additively Manufactured by Selective Laser Melting*, 1st Edition, Jun. 12, 2021, which is hereby incorporated by reference for its teachings of TPMS structures. The TPMS structure may be designed as a "walled TPMS" in which at least some surfaces are formed as thin or thick walls within the structure.

The composite structure may contain a hybrid of multiple types of triply periodic minimal surfaces, or a structure that contains a triply periodic minimal surface and another surface that is not a triply periodic minimal surface. For example, there may be a TPMS unit cell that is adjacent to a region (e.g., an outer wall) that is not a triply periodic minimal surface.

In some embodiments, the first region and the second region form an interpenetrating structure. An "interpenetrating structure" with a first region and a second region means that the first and second regions are topologically and mutually interconnected. The interpenetrating structure may contain one continuous first region, or one continuous second region. In certain embodiments, the interpenetrating structure is a bicontinuous structure, with both a continuous first region and a continuous second region.

Other architectures may be employed for the composite structure, such as (but not limited to) 3D truss lattices or 3D honeycomb lattices. Exemplary 3D truss lattices are a cube lattice, a body-centered lattice, or a kagome lattice, for example. In certain embodiments, a microtruss composite structure is employed. See, for example, U.S. Pat. No. 7,687,132 entitled "Ceramic Microtruss" issued on Mar. 30, 2010 to HRL Laboratories, LLC, which is hereby incorporated by reference herein for its teachings of various microtruss geometries that may be utilized herein.

In some embodiments, the first region is a solid region, which means an average porosity less than 1%, less than 0.5%, less than 0.2%, less than 0.1%, or about 0. In certain embodiments, the first region is a completely non-porous solid region with zero permeability. It will be recognized that even in a completely solid region, there are "pores" on the length scale of atoms or molecules in the material; thus even a solid first region has a first-region pore size, even if it is very low or approaching 0.

In this disclosure, porosity is calculated as the volumetric void (empty space) fraction, relative to total volume of a region of interest, expressed as a percentage. In some embodiments, the first region has an average porosity from about 1% to about 50%. In various embodiments, the first region has an average porosity of about, at least about, or at most about 0%, 0.1%, 0.2%, 0.5%, 1%, 2%, 3%, 4%, 5%, 10%, 15%, 20%, 25%, 30%, 35%, 40%, 45%, or 50%, including any intervening ranges. The first-region porosity may be unimodal or polymodal (e.g., bimodal) in pore-size distribution.

The first-region pore size is the average effective diameter of the pores in that region. In some embodiments, the first-region pore size is less than 100 nanometers, less than 50 nanometers, less than 25 nanometers, less than 10 nanometers, less than 5 nanometers, less than 2 nanometers, or less than 1 nanometer.

In other embodiments, the first-region pore size is selected from about 100 nanometers to about 250 microns. In some embodiments, the first-region pore size may be selected from about 1 micron to about 200 microns. The first-region pore size may be less than about 200 microns, less than about 150 microns, less than about 100 microns, less than about 50 microns, less than about 10 microns, less than about 5 microns, less than about 2 microns, or less than about 1 micron, for example.

In some embodiments, the first-region pore size is about, at least about, or at most about 100 nanometers, 200 nanometers, 300 nanometers, 400 nanometers, 500 nanometers, 600 nanometers, 700 nanometers, 800 nanometers, 900 nanometers, 1 micron, 2 microns, 3 microns, 4 microns, 5 microns, 10 microns, 15 microns, 20 microns, 25 microns, 30 microns, 40 microns, 50 microns, 60 microns, 70 microns, 80 microns, 90 microns, 100 microns, 125 microns, 150 microns, 175 microns, 200 microns, 225 microns, or 250 microns, including all intervening ranges.

In some embodiments, the second region has an average porosity from about 10% to about 95%. In various embodiments, the second region has an average porosity of about, at least about, or at most about 1%, 2%, 3%, 4%, 5%, 10%, 15%, 20%, 25%, 30%, 35%, 40%, 45%, 50%, 60%, 70%, 80%, 85%, 90%, or 95%, including any intervening ranges. The second-region porosity may be unimodal or polymodal (e.g., bimodal) in pore-size distribution.

In some embodiments, the second-region pore size is selected from about 1 micron to about 10 millimeters, such as from about 10 microns to about 1 millimeter. The second-region pore size is the average effective diameter of the pores in that region. In various embodiments, the second-region pore size is about, at least about, or at most about 1 micron, 5 microns, 10 microns, 20 microns, 30 microns, 40 microns, 50 microns, 75 microns, 100 microns, 150 microns, 250 microns, 500 microns, 750 microns, 1 millimeter, 2 millimeters, 3 millimeters, 4 millimeters, 5 millimeters, 6 millimeters, 7 millimeters, 8 millimeters, 9 millimeters, or 10 millimeters, including all intervening ranges.

The first-region and second-region pore sizes may be measured by a variety of techniques, including dynamic light scattering, laser diffraction, image analysis, for example. Image analysis to estimate pore sizes and distributions can be done directly on scanning electron micrographs, for example.

The difference between the second-region pore size and the first-region pore size may be about, at least about, or at most about 500 nanometers, 1 micron, 1.5 microns, 2 microns, 2.5 microns, 5 microns, 10 microns, 25 microns, 50 microns, 100 microns, 200 microns, 300 microns, 400 microns, 500 microns, 750 microns, 1 millimeter, 1.5 millimeters, 2 millimeters, 3 millimeters, 4 millimeters, 5 millimeters, 7.5 millimeters, or 10 millimeters, including all intervening ranges.

Multiple length scales can be important in these structures. In addition to the pore sizes within the first region and second region, there is a characteristic distance between first region-second region interfaces. Typically, there are multiple first regions and multiple second regions (e.g., see FIG. 2). With multiple first and second regions, there will also be multiple first region-second region interfaces, defined by each interface between adjacent first/second regions. The average distance between first region-second region interfaces may be from about 100 microns to about 100 millimeters, for example. In various embodiments, the average distance between first region-second region interfaces is about, at least about, or at most about 10 microns, 50 microns, 100 microns, 500 microns, 1 millimeter, 5 millimeters, 10 millimeters, 25 millimeters, 50 millimeters, 75 millimeters, or 100 millimeters, including all intervening ranges. In certain embodiments, there is an even larger average distance between first region-second region interface, such as about 20 centimeters, 50 centimeters, or even higher. When there is a third region interposed between some of the first and second regions, the average distance between first region-second region interfaces can be calculated with or without taking into account the length scale (e.g., thickness) of the third region.

The porosity of the third region, when present, may be selected from 0% (fully dense) to 100% (fully open). In various embodiments, the average porosity of the third region may be about, at least about, or at most about 0%, 1%, 2%, 5%, 10%, 20%, 30%, 40%, 50%, 60%, 70%, 80%, 90%, 95%, 98%, 99%, or 100%, including all intervening ranges. The length scale of the third region may be very large, up to 1 meter or even larger (e.g., an open channel or a solid wall with effective diameter of about 1 meter).

The overall porosity of the additively manufactured article, taking into account all regions present, may be from about 1% to about 95%, such as about, at least about, or at most about 2%, 5%, 10%, 15%, 20%, 25%, 30%, 35%, 40%, 45%, 50%, 60%, 70%, 80%, 90%, including all intervening ranges.

In some additively manufactured articles, the first region and the second region are co-sintered regions. FIG. 1 depicts a 2D view (including a zoomed-in view) of an exemplary co-sintered additively manufactured article 100. The solid architecture forms a second region 110 that is continuous and forms an interpenetrating structure with the first regions 120, and forms walls surrounding the first regions 120. The plurality of first regions 120 may be regarded collectively as a sintered region, which alternatively forms a continuous region rather a discontinuous region as depicted in FIG. 1. To fabricate the additively manufactured article 100, a defined solid architecture 110 (e.g., a solid-walled TPMS structure) creates a negative space in which a different set of additive-manufacturing parameters are applied in order to sinter and fuse material into a plurality of discrete first regions 120.

Figure 2:
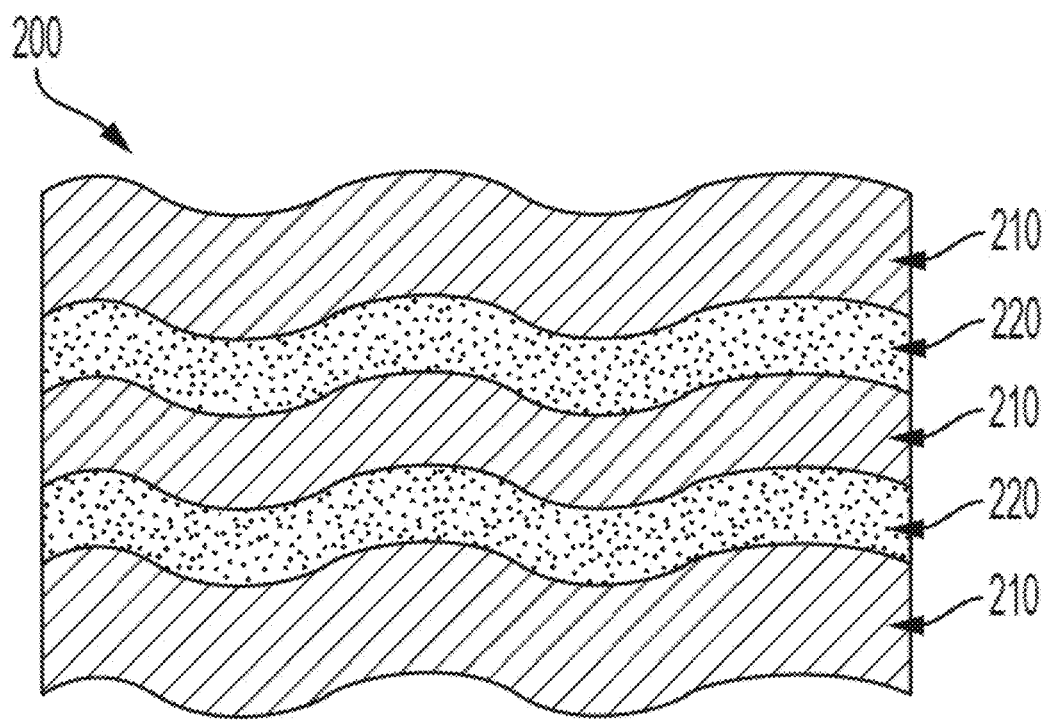
FIG. 2 depicts a 2D zoomed-in view of an exemplary wall-pinned additively manufactured article, in some variations.

In other additively manufactured articles, the first region is a wall-pinned region disposed adjacent to the second region. FIG. 2 depicts a 2D zoomed-in view of an exemplary wall-pinned additively manufactured article 200. The solid architecture comprises a plurality of first regions 210 that form an interpenetrating structure with a plurality of second regions 220. To fabricate the additively manufactured article 200, the length scales of the solid architecture are selected to intentionally pin residual powder between defined solid walls 220, followed by sintering and fusing the pinned powder into a plurality of discrete first regions 210.

In certain additively manufactured articles, the first region and the second region are co-sintered regions and the first region also is, or contains, a wall-pinned region disposed adjacent to the second region.

The first region may be present in the additively manufactured article in a concentration from about 1 wt % to about 99 wt %, such as about 2, 5, 10, 20, 30, 40, 50, 60, 70, 80, 90, or 95 wt %. Independently, the second region may be present in the additively manufactured article in a concentration from about 1 wt % to about 99 wt %, such as about 2, 5, 10, 20, 30, 40, 50, 60, 70, 80, 90, or 95 wt %. The sum of concentrations of first region and second region may be from about 2 wt % to 100 wt %, such as about 5, 10, 15, 20, 25, 30, 40, 50, 60, 70, 80, 90, 95, 99, or 100 wt %. The weight ratio of the first region to the second region may be selected from about 0.01 to about 100, such as from about 0.05 to about 20, for example. A typical weight ratio of the first region to the second region is 1.0, i.e. 50/50 by weight when no other components or regions are present. In various embodiments, the weight ratio of the first region to the second region is about 0.05, 0.1, 0.2, 0.5, 1, 2, 3, 4, 5, 6, 7, 8, 9, 10, 15, 25, 50, including all intervening ranges.

The additively manufactured article may be fabricated from a metal, a metal alloy, a ceramic material, a polymer, a biological material, or a combination thereof.

In some embodiments, the additively manufactured article is fabricated from a metal selected from the group consisting of nickel, aluminum, niobium, tungsten, iron, titanium, zirconium, silicon, combinations thereof, and alloys (e.g., stainless steel), oxides, carbides, nitrides, or hydrides of any of the foregoing.

In some embodiments, the additively manufactured article is fabricated from a ceramic material selected from the group consisting of SiC, SiN, $SiO_2$, $Al_2O_3$, $ZrO_2$, $Ca_5(PO_4)_3OH$ (hydroxylapatite), $Ca_3(PO_4)_2$ (calcium phosphate), combinations thereof, and alloys of any of the foregoing.

In some embodiments, the additively manufactured article is fabricated from ceramic matrix composite, a metal-ceramic composite, a polymer-metal composite, a polymer-ceramic composite, or a combination thereof, optionally containing carbon (e.g., carbon fibers or graphene) in the composite.

In some embodiments, the additively manufactured article is fabricated from a polymer material selected from the group consisting of polyamide polymers (e.g., nylons 6 or nylon 6,6), acrylonitrile butadiene styrene (ABS) polymers, polylactic acid, polypropylene, polyethylene terephthalate, polyvinyl alcohol, polyetheretherketone (PEEK), polycaprolactone, or polycarbonate, for example.

In some embodiments, the additively manufactured article is fabricated from a biological material selected from the group consisting of alginate, chitosan, silk, collagen, fibrin, gelatin, proteins, enzymes, and combinations thereof. The additively manufactured article may be used in architected tissue reconstruction, for example.

See commonly owned U.S. patent application Ser. No. 16/784,890 (Martin et al.), filed on Feb. 7, 2020, which is incorporated by reference for materials and methods that may be utilized in the present disclosure.

Some variations provide a co-sintering method of making an architected material with regions having different permeabilities, the method comprising:
 (a) defining a composite structure (e.g., TPMS) to be fabricated, wherein the composite structure contains at least a first region and a second region;
 (b) introducing an additive-manufacturing feedstock to a build volume;
 (c) additively manufacturing an architected material utilizing a first set of process parameters to fabricate the first region and a second set of process parameters to fabricate the second region, wherein the first region has a first-region pore size selected from about 100 nanometers to about 250 microns, wherein the second region has a second-region pore size that is larger than the first-region pore size, wherein the first region is characterized by a first average permeability, wherein the second region is characterized by a second average permeability, and wherein the first average permeability is lower (e.g., at least one order of magnitude lower) than the second average permeability; and
 (d) recovering the architected material from the build volume.

The additive manufacturing process may be selective laser melting (SLM), electron beam melting (EBM), and/or laser engineered net shaping (LENS), for example. Selective laser melting is an additive manufacturing technique designed to use a high power-density laser to melt and fuse metallic powders together. Selective laser melting has the ability to fully melt the metal material into a solid 3D part. Electron-beam melting is a type of additive manufacturing for metal parts. Metal powder is welded together, layer by layer, under vacuum using an electron beam as the heat source. Laser engineered net shaping is an additive manufacturing technique developed for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication as well.

In additive manufacturing, there is a large number of process parameters that may be adjusted and controlled. In this disclosure, a "process parameter," "AM process parameter," and the like, are specifically in reference to additive manufacturing. Process parameters include, but are not limited to, beam type (laser beam or electron beam), beam power, beam scan speed, beam spot size, beam scan path/strategy, exposure sequence, layer thickness, layer rotation, layer contouring, scan overlap, fill overlap, hatch overlap, gas atmosphere, temperature, and pressure. "Solid parameters" or "solid AM parameters" refer to process parameters that cause melting and solidification of feedstock material. "Sintering parameters" or "sintering AM parameters" refer to process parameters that cause coalescence of feedstock material into a solid or porous solid by heating without liquefaction. In additive manufacturing, a computer-aided design (CAD) file is typically created to specify a parameter strategy prior to carrying out the additive manufacturing, for cost, quality, and safety reasons.

Additive manufacturing allows local (small-scale) control of build parameters and solidification conditions. For example, the microstructure of an article, or region of interest, may be spatially controlled across multiple length scales based on solidification conditions that are, in turn, controlled by the selected and locally applied additive-manufacturing process parameters. Solidification conditions may be controlled so that the structure of the article includes either connected (continuous) or discrete (discontinuous) regions.

Additive manufacturing may be observable in the final article in various ways, such as the presence of a scalloped build pattern, which has variation in phase boundaries in the build direction. In some embodiments, an additively manufactured microstructure has a crystallographic texture that is not solely oriented in an additive-manufacturing build direction. For example, the additively manufactured microstructure may contain a plurality of dendrite layers having differing primary growth-direction angles with respect to each other.

Figure 3:
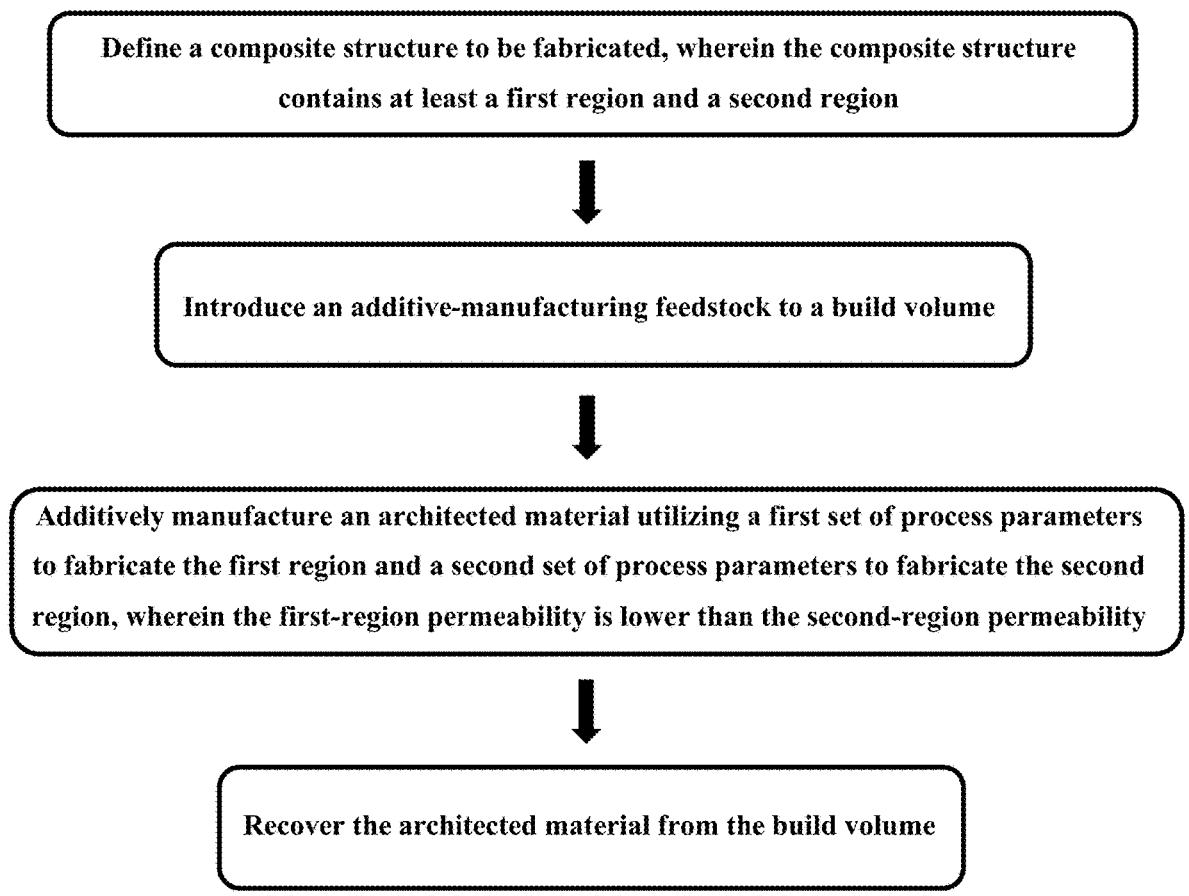
FIG. 3 depicts a flowchart for an exemplary method utilizing the co-sintering approach, in some variations.

FIG. 3 depicts a flowchart for an exemplary method utilizing the co-sintering approach. In some methods relating to co-sintering, a composite architecture (e.g., a 3D truss lattice) is selected. Then, a negative space within the composite architecture is defined. The composite architecture is additively manufacturing by applying at least two sets of AM parameters-solid parameters for the positive space (e.g., 3D truss walls) and sintering parameters for the negative space. Optionally, the sintering parameters may be applied to both the positive space and the negative space, if fine porosity is desired within a certain region.

FIGS. 1 and 3 show the general approach to co-sintering in which a solid composite architecture is defined. Suitable AM parameters are applied to reach a fully dense state for the positive space. The negative space is defined and suitable AM sintering parameters are applied to material in order to sinter and reduce, or optimize, porosity and permeability. The power density during sintering can be used to dictate the porosity and permeability in the region. See the Example and FIGS. 5-8.

The composite architecture provides several benefits, including additional structural support to the porous material not typical of bulk sintered material. Additionally, the creation of local defined cells of powder for sintering increases the repeatability and stability of the sintering parameters. Heat flow in additive manufacturing is often difficult to control. Sintering a large bulk material with a high-energy laser would ordinarily create large variations in material properties, as the thermal gradients would continue to change through the height of the sample as a more and more insulating porous structure is developed. By contrast, the disclosed composite structures provide a relatively uniform sintering area in each cell as well as at the walls. The result is a spatially controlled cell with a thermal short to the bulk material, ensuring more uniform parametric control through the height of the additively manufactured article in the build direction.

In some methods, in step (c), the first region and the second region are fabricated simultaneously. Alternatively, the second region may be fabricated before the first region, or the second region may be fabricated after the first region. There may be overlap, such that a fraction of one region is fabricated, then the other region starts to be fabricated while the initial region is completed. In one example, a second region is fabricated using solid AM parameters, after which a first region is fabricated using sintering AM parameters; some sintering starts to take place as heat is transported from the second region during melting and solidification.

In certain embodiments, the method further comprises applying the first set of process parameters (e.g., sintering parameters) to the second region. For example, it may be desirable to reduce the permeability at the walls by sintering some powder in the wall region, in addition to sintering in the initial negative space.

In certain embodiments, the method further comprises applying the second set of process parameters (e.g., melting/solidification parameters) to the first region. For example, it may be desirable to melt and resolidify some of the sintered region.

In the co-sintering methods, the first average permeability is lower than the second average permeability, which means that there is a statistical difference in permeabilities, outside of random variations in the first and second regions. In various embodiments, the first average permeability is about, or at least about, 1%, 5%, 10%, 25%, 50%, 100%, 200%, 300%, 400%, 500%, 600%, 700%, 800%, 900%, or 1000% lower than the second average permeability, including all intervening ranges. Preferably, the first average permeability is at least one order of magnitude lower than the second average permeability.

In some co-sintering methods, the first average permeability is about, or at least about, 1000%, 2000%, 3000%, 4000%, 5000%, 6000%, 7000%, 8000%, 9000%, or 10000% lower than the second average permeability, including all intervening ranges. In certain embodiments, the first average permeability is at least two orders of magnitude lower than the second average permeability.

In some co-sintering methods, the additive-manufacturing feedstock is a powder. In other co-sintering methods, the additive-manufacturing feedstock is a wire. In certain co-sintering methods, the additive-manufacturing feedstock is a wire and a powder, such as at different times during additive manufacturing, or a wire coated with a powder, for example.

The co-sintering additive-manufacturing feedstock may be a metal, a metal alloy, a ceramic material, a polymer, a biological material, or a combination thereof.

In some embodiments, the co-sintering additive-manufacturing feedstock is a metal selected from the group consisting of nickel, aluminum, niobium, tungsten, iron, titanium, zirconium, silicon, combinations thereof, and alloys (e.g., stainless steel), oxides, carbides, nitrides, or hydrides of any of the foregoing.

In some embodiments, the co-sintering additive-manufacturing feedstock is a ceramic material selected from the group consisting of SiC, SiN, $SiO_2$, $Al_2O_3$, $ZrO_2$, combinations thereof, and alloys of any of the foregoing.

In some embodiments, the co-sintering additive-manufacturing feedstock is a polymer material selected from the group consisting of polyamide polymers (e.g., nylons 6 or nylon 6,6), acrylonitrile butadiene styrene (ABS) polymers, polylactic acid, polypropylene, polyethylene terephthalate, or polycarbonate, for example.

Some variations provide an additively manufactured article produced by a process comprising:
  (a) defining a composite structure (e.g., TPMS) to be fabricated, wherein the composite structure contains at least a first region and a second region;

(b) introducing an additive-manufacturing feedstock to a build volume;

(c) additively manufacturing an architected material utilizing a first set of process parameters to fabricate the first region and a second set of process parameters to fabricate the second region, wherein the first region has a first-region pore size selected from about 100 nanometers to about 250 microns, wherein the second region has a second-region pore size that is larger than the first-region pore size, wherein the first region is characterized by a first average permeability, wherein the second region is characterized by a second average permeability, and wherein the first average permeability is lower (e.g., at least one order of magnitude lower) than the second average permeability; and (d) recovering the architected material from the build volume.

Other variations provide a wall-pinning method of making an architected material with regions having different permeabilities, the method comprising:

(a) defining a composite structure to be fabricated, wherein the composite structure may be characterized by a wall spacing selected from about 25 microns to about 500 microns;

(b) introducing an additive-manufacturing feedstock powder to a build volume;

(c) additively manufacturing an architected material utilizing a set of process parameters to fabricate a wall region, and wherein the process parameters are selected to retain pinned feedstock powder between walls of the wall region;

(d) consolidating the pinned feedstock powder to fabricate a pinned region; and (e) recovering the architected material from the build volume, wherein the pinned region is characterized by a first average permeability, wherein the wall region is characterized by a second average permeability, and wherein the first average permeability is lower (e.g., at least one order of magnitude lower) than the second average permeability.

Figure 4:
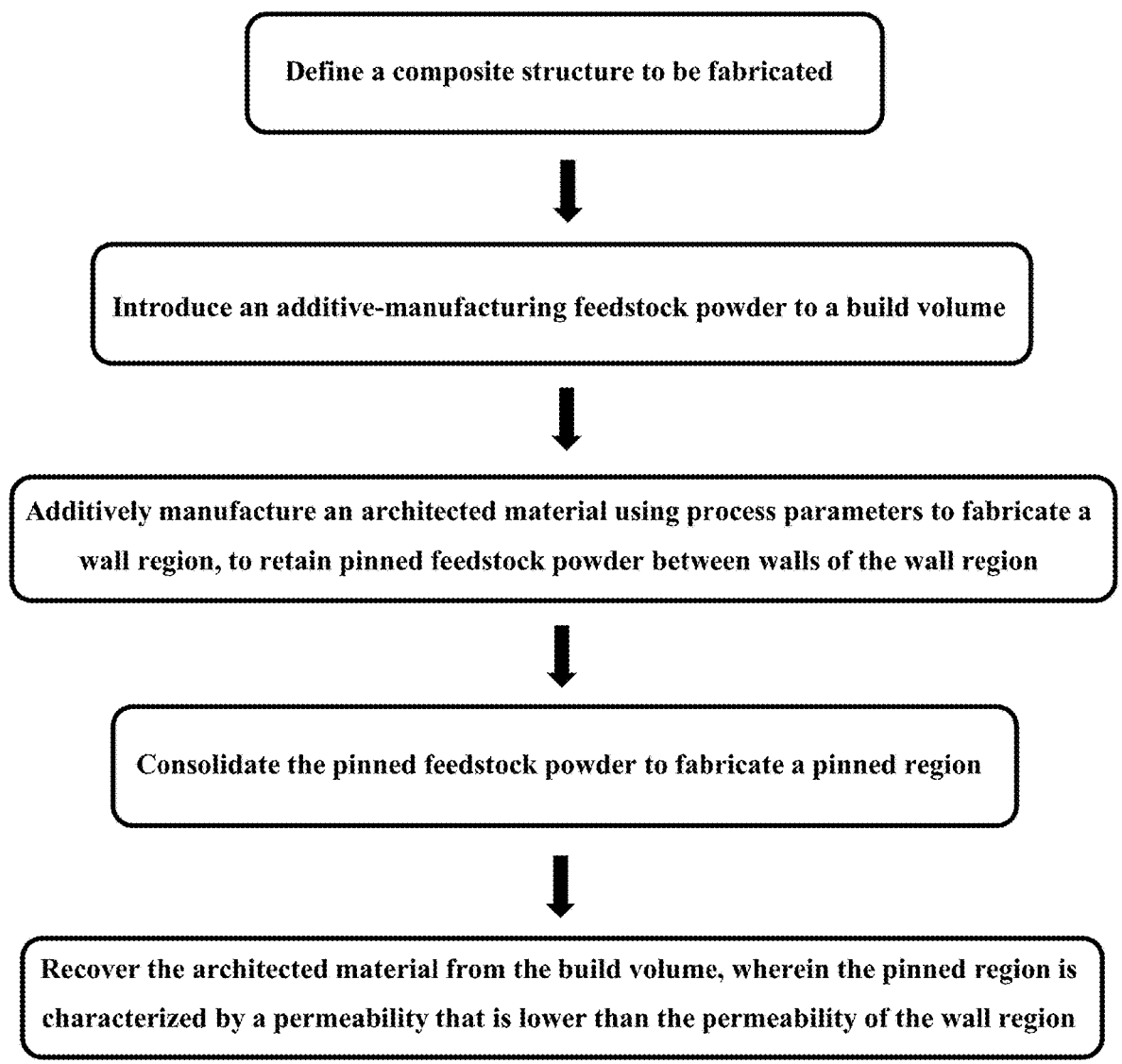
FIG. 4 depicts a flowchart for an exemplary method utilizing the wall-pinning approach, in some variations.

FIG. 4 depicts a flowchart for an exemplary method utilizing the wall-pinning approach. In some methods relating to wall pinning, a composite architecture (e.g., a walled gyroid TPMS) is selected such that there is wall spacing of about 200 microns or shorter—or less than the applicable 3D-printing resolution—for at least a portion of the architecture. The average wall thickness is greater than 200 microns—or greater than the applicable 3D-printing resolution. Then, the composite architecture is additively manufacturing by applying a single set of AM solid parameters.

The "wall spacing" is defined as the average distance between adjacent walls in the composite architecture. In some wall-pinning methods, the wall spacing is about 200 microns or less, such as about 100 microns or less. In some wall-pinning methods, the wall spacing is 200 microns or greater, such as when a lower-resolution 3D printer is employed. In certain methods, the wall spacing is selected from about 50 microns to about 200 microns.

FIGS. 2 and 4 show the general approach to wall pinning in which a solid composite architecture is defined. In the wall-pinning method, instead of exposing the negative space within the solid architecture to different process parameters, the length scale of the negative space is minimized to a level which ensures that contour passes are about, or less than, the resolution of the additive manufacturing (typically about 200 microns, although the resolution varies). Controlling the contour passes to be below the printer resolution is normally avoided. The present inventors have discovered that by counterintuitively designing the composite architecture in this manner, the anticipated variability in printing and the low 3D-printing resolution can be taken advantage, pinning residual powder between two defined solid walls. The residual heat and melt-pool dynamics near the interface fuse and trap powder at the interface to create a tortuous path for fluid flow, thereby increasing the resistance to fluid flow and lowering the permeability below the CAD-designed permeability. Controlling the AM process parameters and the wall spacing can increase or decrease the permeability by causing more or less powder trapping.

In the wall-pinning methods, the first average permeability is lower than the second average permeability, which means that there is a statistical difference in permeabilities, outside of random variations in the first and second regions. In various embodiments, the first average permeability is about, or at least about, 1%, 5%, 10%, 25%, 50%, 100%, 200%, 300%, 400%, 500%, 600%, 700%, 800%, 900%, or 1000% lower than the second average permeability, including all intervening ranges. Preferably, the first average permeability is at least one order of magnitude lower than the second average permeability.

In some wall-pinning methods, the first average permeability is about, or at least about, 1000%, 2000%, 3000%, 4000%, 5000%, 6000%, 7000%, 8000%, 9000%, or 10000% lower than the second average permeability, including all intervening ranges. In certain embodiments, the first average permeability is at least two orders of magnitude lower than the second average permeability.

The wall-pinning additive-manufacturing feedstock powder may be a metal, a metal alloy, a ceramic material, a polymer, a biological material, or a combination thereof.

An additive manufacturing feedstock generally (unless otherwise specified) includes any powder, wire, ribbon, or other geometry which in some variations may be used for additive manufacturing, depending on the manufacturing equipment employed or customized. In a typical embodiment, the starting feedstock is a powder. For example, the feedstock may include a mixture of a powder of a first metal and a powder of a second metal, in intimate physical contact. "Intimate physical contact" means that the two powders are physically blended (mixed) together, to form the feedstock powder. In some embodiments, there are chemical bonds between particles of the first metal and second metal. Chemical bonding results in intimate physical contact between the powder particles.

A feedstock powder may be in any form in which discrete particles can be reasonably distinguished from the bulk. The powder may be present as loose powders, a paste, a suspension, or a green body, for example. A green body is an object whose main constituent is weakly bound powder material, before it has been melted and solidified. Particles may be solid, hollow, or a combination thereof. Particles can be made by any means including, for example, gas atomization, milling, cryomilling, wire explosion, laser ablation, electrical-discharge machining, or other techniques known in the art.

In some embodiments, a feedstock is provided with an average particle size from about 0.1 microns to about 500 microns, such as from about 10 microns to about 100 microns.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The powder particles may have a narrow or wide particle-size distribution, although a narrow size distribution is usually preferred. The particle-size distribution may be characterized by a particle-size dispersity index, which is the ratio of particle-size standard deviation to average particle size (also known as the coefficient of variance). In various embodiments, the powder particle-size dispersity index is about 0.05, 0.1, 0.2, 0.3, 0.4, 0.5, 0.6, 0.7, 0.8, 0.9, or 1.0.

The particle-size distribution of the powder may also be characterized by reference to D10, D50, and D90, for example. D10 is the diameter where ten percent of the distribution has a smaller particle size and ninety percent has a larger particle size. D50 is the diameter where fifty percent of the distribution has a smaller particle size and fifty percent has a larger particle size. D90 is the diameter where ninety percent of the distribution has a smaller particle size and ten percent has a larger particle size. An exemplary powder for additive manufacturing via selective laser melting has D10=20 microns and D90=60 microns. In various embodiments, D10 is about 1, 5, 10, 20, 30, 40, or 50 microns while D90 is about 5, 10, 20, 30, 40, 50, 60, 70, 80, 90, or 100 microns.

Some embodiments utilize materials, methods, and principles described in commonly owned U.S. patent application Ser. No. 15/209,903, filed Jul. 14, 2016, commonly owned U.S. patent application Ser. No. 15/808,877, filed Nov. 9, 2017, and/or commonly owned U.S. patent application Ser. No. 16/565,570, filed Sep. 10, 2019, each of which is hereby incorporated by reference herein. For example, certain embodiments utilize surface-functionalized powder feedstocks. The present disclosure is not limited to surface-functionalized powders.

In some embodiments, the wall-pinning additive-manufacturing feedstock is a metal selected from the group consisting of nickel, aluminum, niobium, tungsten, iron, titanium, zirconium, silicon, combinations thereof, and alloys (e.g., stainless steel), oxides, carbides, nitrides, or hydrides of any of the foregoing.

In some embodiments, the wall-pinning additive-manufacturing feedstock is a ceramic material selected from the group consisting of SiC, SiN, $SiO_2$, $Al_2O_3$, $ZrO_2$, combinations thereof, and alloys of any of the foregoing.

In some embodiments, the wall-pinning additive-manufacturing feedstock is a polymer material selected from the group consisting of polyamide polymers (e.g., nylons 6 or nylon 6,6), acrylonitrile butadiene styrene (ABS) polymers, polylactic acid, polypropylene, polyethylene terephthalate, or polycarbonate, for example.

In some wall-pinning methods, the consolidating in step (d) is passive sintering driven by residual heat associated with the wall region. Alternatively, or additionally, the consolidating may be active sintering driven by additional heat introduced to the pinned feedstock powder. Additional heat may be provided by various means, such as via a heated gas atmosphere, or via electromagnetic induction to heat susceptor metals within the powder to be sintered, for example.

In some wall-pinning methods, the consolidating is or includes physical powder trapping with complete or incomplete powder sintering. In certain embodiments, the consolidating is or includes physical powder trapping with substantially no powder sintering. Such embodiments may be useful when compacted powders provide the desired flow permeability, or when slow particle release is beneficial—e.g., for corrosion control downstream of the additively manufactured article.

Some variations provide an additively manufactured article produced by a process comprising:
(a) defining a composite structure to be fabricated, wherein the composite structure may be characterized by a wall spacing selected from about 25 microns to about 500 microns;
(b) introducing an additive-manufacturing feedstock powder to a build volume;
(c) additively manufacturing an architected material utilizing a set of process parameters to fabricate a wall region, wherein the architected material is a composite structure (e.g., a bicontinuous structure), and wherein the process parameters are selected to retain pinned feedstock powder between walls of the wall region;
(d) consolidating the pinned feedstock powder to fabricate a pinned region; and
(e) recovering the architected material from the build volume, wherein the pinned region is characterized by a first average permeability, wherein the wall region is characterized by a second average permeability, and wherein the first average permeability is lower (e.g., at least one order of magnitude lower) than the second average permeability.

Co-sintering and wall pinning are both local techniques that do not substantially impact the article outside of the controlled region. Therefore, the disclosed methodologies may be applied and distributed throughout a structure to design local permeability changes within that structure. These changes may be digitally (via CAD) defined prior to creating the additive-manufacturing build file and then produced in a single additive-manufacturing run, rather than multiple, sequential procedures.

Regions of one or more of the following types may thus be incorporated into a single 3D-printed part fabricated from a single additive-manufacturing process:
  Co-sintered regions
  Wall-pinned regions
  Pores between AM-defined walls (e.g., 200-1000 μm wall spacing)
  Highly dense regions, with e.g. less than 10%, 5%, 2%, or 1% porosity
  Fully dense regions (0% porosity)
  Empty regions (100% porosity)

Secondary treatments of the additively manufactured article may be applied. Etching may be used to adjust the porosity, to further tailor the fluid permeability. Additionally, deposition techniques, such as atomic layer deposition, chemical vapor deposition, electrodeposition, or electroless deposition may be utilized to increase chemical compatibility, to adjust (e.g., decrease) permeability, or for other reasons. In the case of aluminum alloys or other anodizable alloys, anodization, electrochemical deposition, or electrochemical removal techniques may be employed. Oxidizing, nitriding, and/or carbiding may be employed as secondary treatments. Heat treatments may be used to further optimize the phase length scales and microstructure hierarchy, if desired. Any of these secondary treatments may be applied to the entire additively manufactured article, or selectively to one or more regions of the article. Post-production processes such as light machining, surface finishing, coloring, stamping, or other finishing operations may be applied.

The additively manufactured article may be used in a wide variety of ways. The additively manufactured article may be architected to direct fluid flow, vapor flow, or flow derived from a melted and/or vaporized solid.

The additively manufactured article may be used for electronics thermal management, for transpiration cooling, or for heat pipes. The additively manufactured article may be a loop heat pipe, a flat heat pipe, or a heat spreader. For example, the additively manufactured article may be an additively manufactured heat pipe wherein the wick is a co-sintered region and/or a wall-pinned region. In a specific example, the additively manufactured article may be contained in a heat pipe with a porous wick. See commonly owned U.S. patent application Ser. No. 16/876,077 (Roper et al.), filed on May 17, 2020, which is incorporated by reference.

The additively manufactured article may be used in microfluidics (e.g., in medical diagnostic chips), biomedical applications, filtration, flame arrestors, catalysts, catalyst supports, catalyst recycling, burners, or vibration and sound absorption. The additively manufactured article may be used for heat exchangers, sensors, evaporators, electromagnetic shielding, thermal insulation, energy absorption, lightweight optics, mass transfer (e.g., scrubbers, separators, etc.), electrodes, breather regions to equalize pressure, or cryogenic tanks. The additively manufactured article may be utilized in applications at extreme temperatures (high or low) and/or in harsh chemical environments, for example.

EXAMPLES

Figure 5:
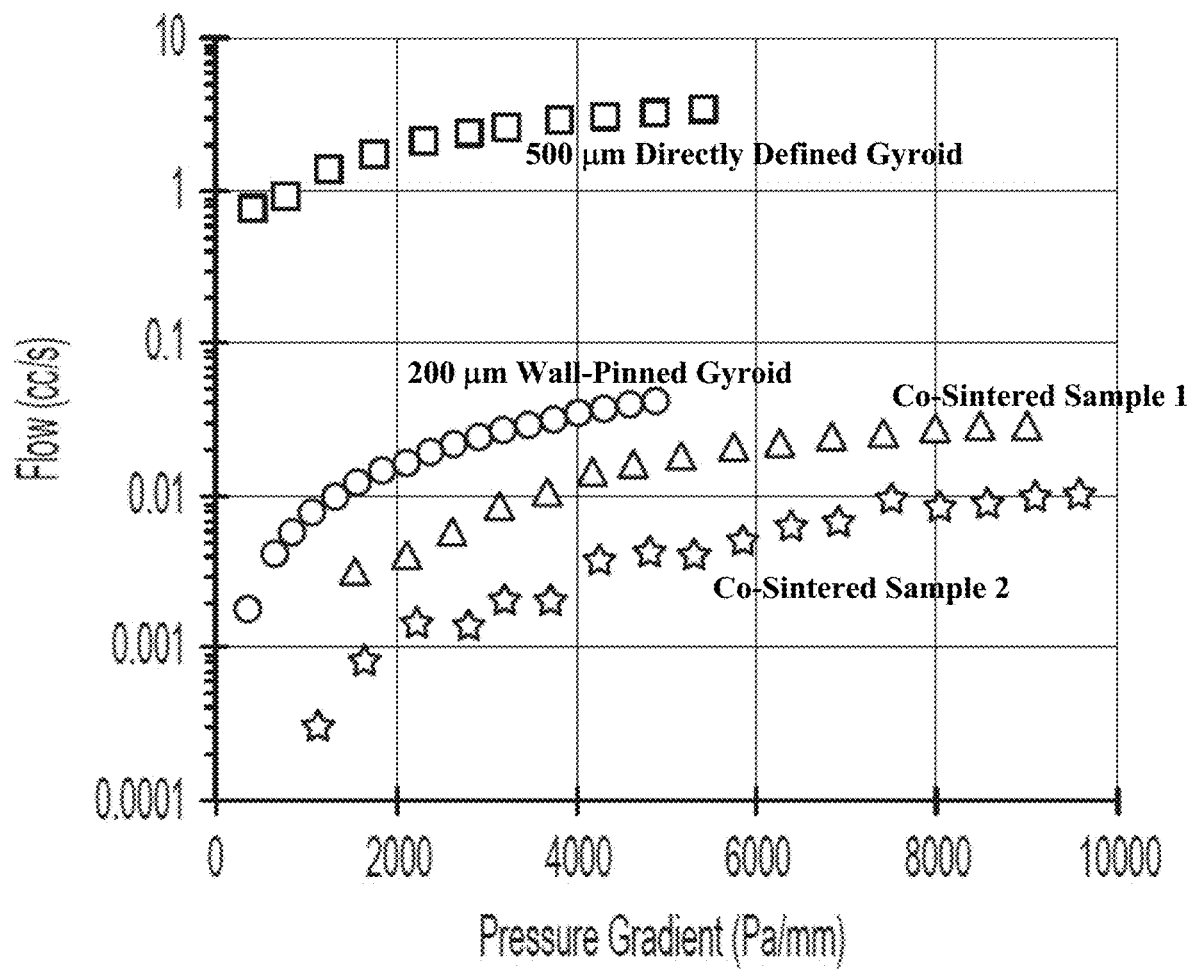
FIG. 5 shows the variation in flow through different porous media using different fabrication methods, demonstrating permeability control over 3 orders of magnitude, in Example 1.

Example 1: Co-Sintered Articles of Inconel 625 Demonstrating Variable Additive-Manufacturing Process Parameters Porous media are fabricated using different fabrication methods as disclosed in this specification. FIG. 5 shows the variation in flow through the different porous media, demonstrating permeability control over 3 orders of magnitude. As shown in FIG. 5, the permeability is highest through a directly defined 500 µm gyroid. The directly defined 500 µm gyroid is a gyroid TPMS structure, but with wall spacing so far apart that there is no co-sintering, creating large openflow channels. The permeability is lowest for co-sintered sample 2. The permeability for the 200 µm wall-pinned gyroid is intermediate between the permeabilities of the other structures tested.

Figure 6:
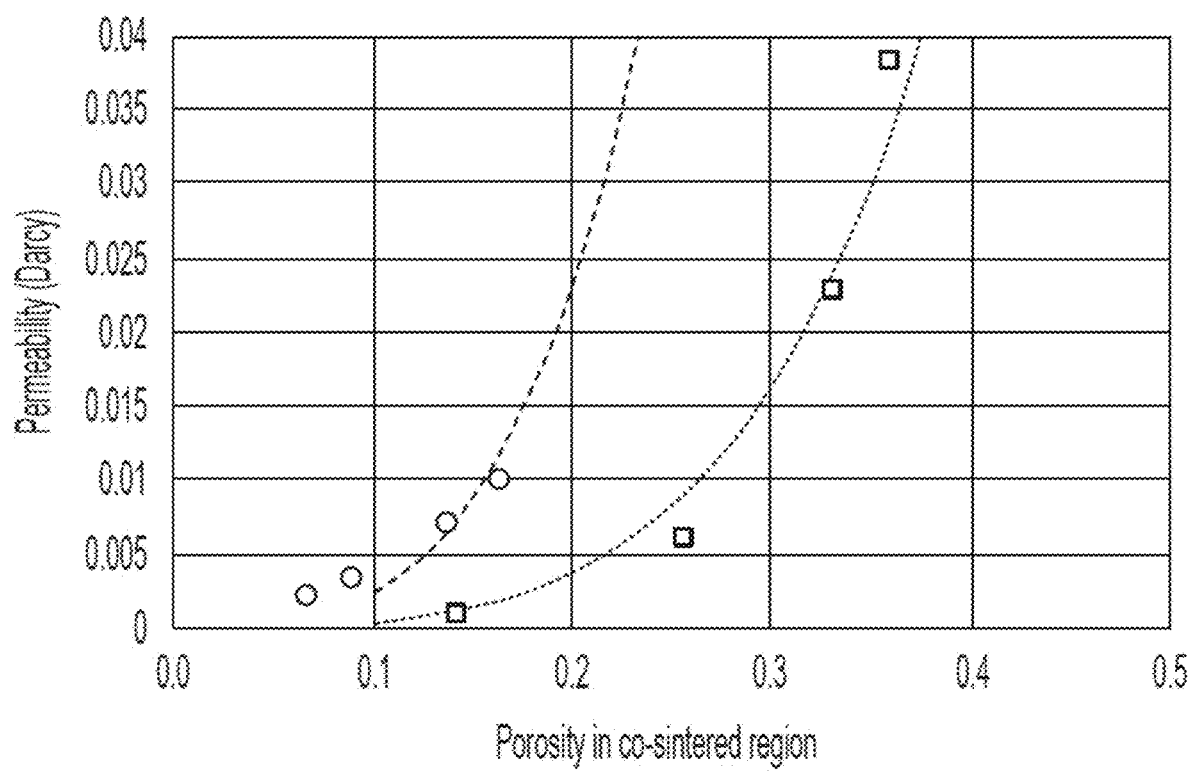
FIG. 6 shows a Carmen-Kozeny model with sphericity as an adjustable parameter, demonstrating parametric permeability control, in Example 1.

FIG. 6 shows a Carmen-Kozeny model with sphericity as an adjustable parameter, demonstrating parametric permeability control. The curves of FIG. 6 are not simple data fits but rather are model plots according to the well-known Carmen-Kozeny equation. The eight symbols (four circles and four squares) each correspond to a distinct experimental sample. Two of the squares of FIG. 6 correspond to co-sintered sample 1 and co-sintered sample 2 of FIG. 5. The Carmen-Kozeny equation that is fitted to the squares (long dashes in FIG. 6) is based on the application of co-sintering laser passes everywhere, using a first power density (first sintering parameter). The Carmen-Kozeny equation that is fitted to the circles (short dashes in FIG. 6) is based on the application of co-sintering laser passes only to the porous region, using a second power density (second sintering parameter).

Figure 7:
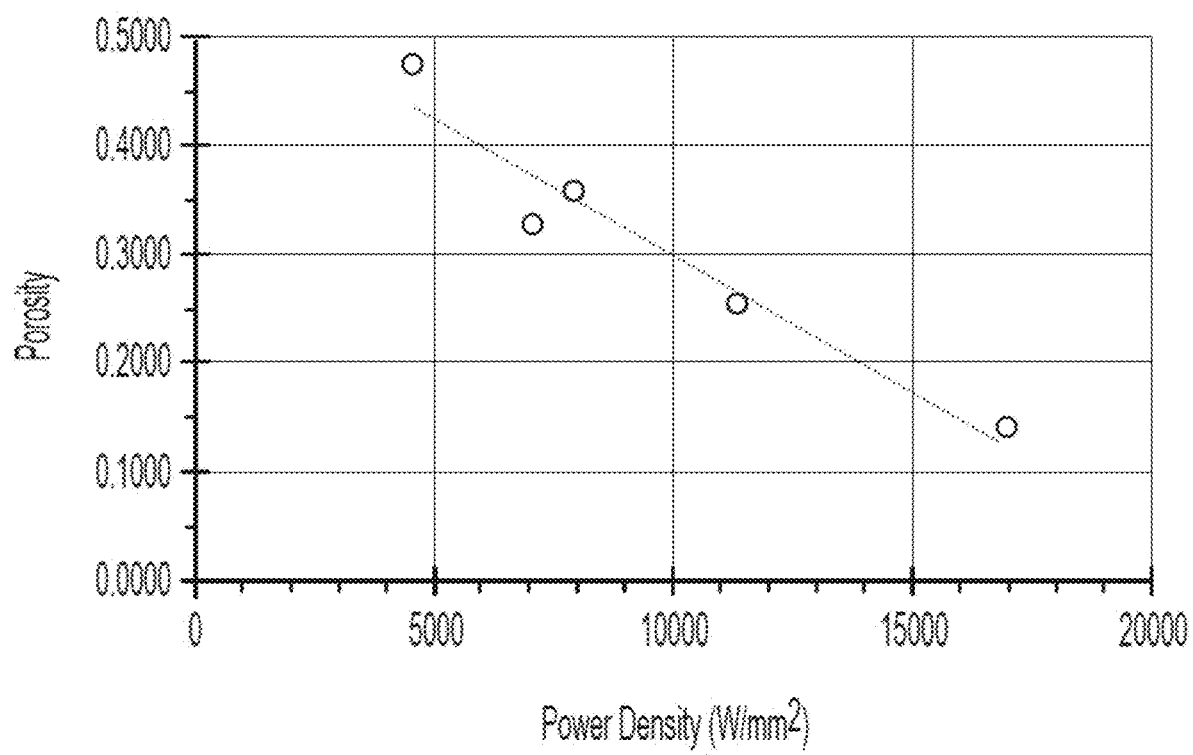
FIG. 7 shows the porosity in the co-sintered region for the articles of Example 1, as a function of power density (a sintering parameter), demonstrating direct parametric control over porosity and permeability.
Figure 8:
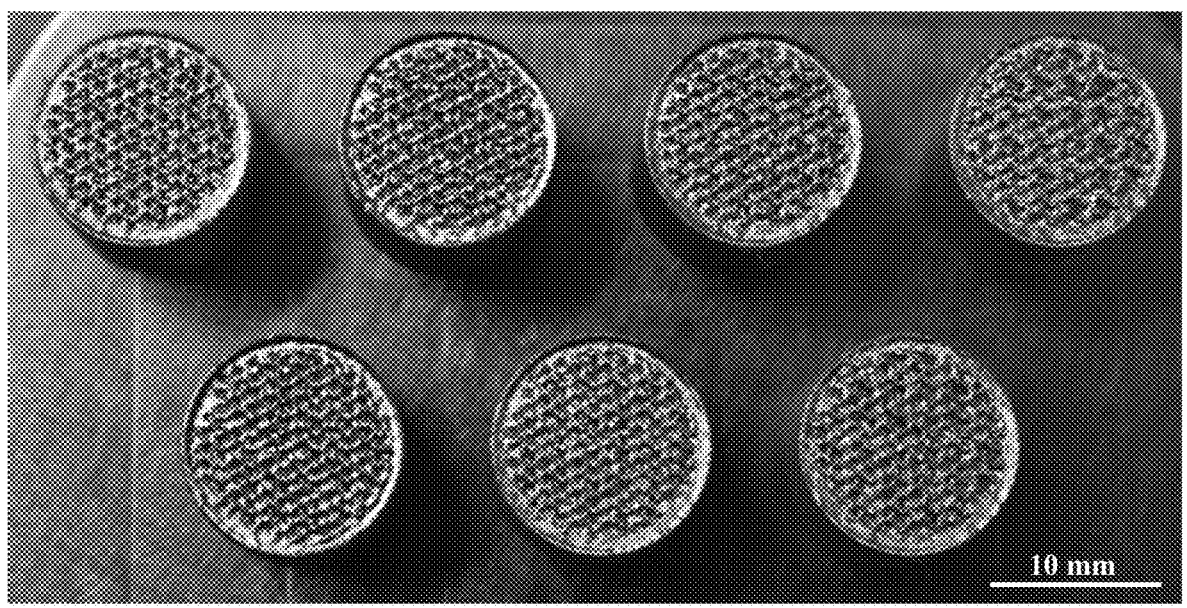
FIG. 8 is a photomicrograph of co-sintered Inconel 625 additively manufactured articles, in Example 1.

FIG. 7 shows the porosity in the co-sintered region for the articles shown in FIG. 8, as a function of power density (a sintering parameter), demonstrating direct parametric control over porosity and thus permeability.

FIG. 8 is a magnified photomicrograph (scale bar=10 millimeters) of co-sintered Inconel 625 coupons. The coupons have a cylinder diameter of about 0.5 inches (12.7 mm). Some of these co-sintered coupons are utilized for the measurements in FIGS. 5, 6, and 7.

Commercial applications include fuel injection (e.g. scramjet combustion) and cooling options for rocket nozzles or afterburner systems where high heat flux may be observed. In the case of spatially controlled gas flow, enhancing stability of laminar flow may increase aerodynamic efficiency. Other applications include, but are not limited to, medical diagnostics and microfluidics.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An additively manufactured article comprising a first region and a second region, wherein said first region has a first-region pore size, wherein said second region has a second-region pore size, wherein said second-region pore size is larger than said first-region pore size, wherein said first region is characterized by a first average permeability, wherein said second region is characterized by a second average permeability, wherein said first average permeability is lower than said second average permeability, wherein said first region and said second region form an interpenetrating, bicontinuous structure, wherein said first region is a wall-pinned region interposed between walls of said second region, wherein said wall-pinned region is characterized by a wall-pinned region spacing from about 25 microns to about 200 microns, wherein said wall-pinned region spacing is defined as the average distance between adjacent walls of said second region, and wherein said additively manufactured article is fabricated from a material selected from the group consisting of nickel, aluminum, niobium, tungsten, iron, titanium, zirconium, silicon, molybdenum, chromium, cobalt, copper, silver, gold, combinations thereof, and alloys, oxides, carbides, nitrides, or hydrides of any of the foregoing.

2. The additively manufactured article of claim 1, wherein said first average permeability is at least one order of magnitude lower than said second average permeability.

3. The additively manufactured article of claim 1, wherein said first average permeability is selected from about 0.1 mD to about 100 D.

4. The additively manufactured article of claim 1, wherein said second average permeability is selected from about 1 mD to about 1000 D.

5. The additively manufactured article of claim 1, wherein said first region has an average porosity less than 1%.

6. The additively manufactured article of claim 1, wherein said first region has an average porosity from about 1% to about 50%.

7. The additively manufactured article of claim 1, wherein said first-region pore size is less than 100 nanometers.

8. The additively manufactured article of claim 1, wherein said first-region pore size is selected from about 100 nanometers to about 150 microns.

9. The additively manufactured article of claim 1, wherein said second region has an average porosity from about 10% to about 95%.

10. The additively manufactured article of claim 1, wherein said second-region pore size is selected from about 50 microns to about 1 millimeter.

11. The additively manufactured article of claim 1, wherein said additively manufactured article further comprises a third region, and wherein said third region is characterized by a third average permeability.

12. The additively manufactured article of claim 11, wherein said third region is a manifold or plenum.

13. An additively manufactured article comprising a first region and a second region, wherein said first region has a first-region pore size, wherein said second region has a second-region pore size, wherein said second-region pore size is smaller than said first-region pore size, wherein said first region is characterized by a first average permeability, wherein said second region is characterized by a second average permeability, wherein said first average permeability is higher than said second average permeability, wherein said first region and said second region form an interpenetrating, bicontinuous structure, wherein said first region is a wall-pinned region interposed between walls of said second region, wherein said wall-pinned region is characterized by a wall-pinned region spacing from about 25 microns to about 200 microns, wherein said wall-pinned region spacing is defined as the average distance between adjacent walls of said second region, and wherein said additively manufactured article is fabricated from a material selected from the group consisting of nickel, aluminum, niobium, tungsten, iron, titanium, zirconium, silicon, molybdenum, chromium, cobalt, copper, silver, gold, combinations thereof, and alloys, oxides, carbides, nitrides, or hydrides of any of the foregoing.

14. The additively manufactured article of claim 13, wherein said first average permeability is at least one order of magnitude larger than said second average permeability.

15. The additively manufactured article of claim 13, wherein said first average permeability is selected from about 1 mD to about 1000 D.

16. The additively manufactured article of claim 13, wherein said second average permeability is selected from about 0.1 mD to about 100 D.

17. The additively manufactured article of claim 13, wherein said first region has an average porosity from about 10% to about 95%.

18. The additively manufactured article of claim 13, wherein said first-region pore size is selected from about 100 nanometers to about 150 microns.

19. The additively manufactured article of claim 1, wherein said second region has an average porosity from about 1% to about 50%.

20. The additively manufactured article of claim 13, wherein said second region has an average porosity less than 1%.

21. The additively manufactured article of claim 13, wherein said additively manufactured article further comprises a third region, and wherein said third region is characterized by a third average permeability.

22. The additively manufactured article of claim 21, wherein said third region is a manifold or plenum.

* * * * *